United States Patent
Takayama

[19]

[11] Patent Number: 5,997,106
[45] Date of Patent: Dec. 7, 1999

[54] BRAKE FLUID PRESSURE CONTROL SYSTEM AND METHOD OF CONTROLLING THE SAME

[75] Inventor: Toshio Takayama, Yamanashi-ken, Japan

[73] Assignee: Tokico Ltd., Kanagawa-ken, Japan

[21] Appl. No.: 08/947,152

[22] Filed: Oct. 8, 1997

[30] Foreign Application Priority Data

Oct. 18, 1996 [JP] Japan .................................. 8-276540

[51] Int. Cl.⁶ ................................ B60T 8/88; B60T 8/40
[52] U.S. Cl. ................................ 303/122.05; 303/116.1; 303/10
[58] Field of Search ................................ 303/3, 15, 10, 303/20, 116.1, 115.4, 122.05

[56] References Cited

U.S. PATENT DOCUMENTS

| | | | |
|---|---|---|---|
| 4,708,406 | 11/1987 | Takagi et al. ...................... | 303/122.08 |
| 4,824,182 | 4/1989 | Steffes et al. ...................... | 303/122.08 |
| 4,832,418 | 5/1989 | Mattusch ........................... | 303/122.08 |
| 5,302,008 | 4/1994 | Miyake et al. ...................... | 303/14 |
| 5,613,740 | 3/1997 | Kawamoto et al. ...................... | 303/11 |
| 5,810,456 | 9/1998 | Inagaki et al. ...................... | 303/116.1 |

FOREIGN PATENT DOCUMENTS

| | | |
|---|---|---|
| 39 22 947 A1 | 1/1991 | Germany . |
| 195 12 254 A1 | 10/1996 | Germany . |
| 5-65060 | 3/1993 | Japan . |

*Primary Examiner*—Robert J. Oberleitner
*Assistant Examiner*—Robert A. Siconolfi
*Attorney, Agent, or Firm*—Wenderoth, Lind & Ponack, L.L.P.

[57] ABSTRACT

A brake fluid pressure control system includes an external source of fluid pressure, a wheel cylinder, and a fluid pressure control valve disposed between the external source of fluid pressure and the wheel cylinder. A controller is operable to control the fluid pressure control valve whereby fluid pressure under control is fed from the external source of fluid pressure to the wheel cylinder. When a change in pressure within the wheel cylinder occurs, a fail safe valve is operable to disconnect the wheel cylinder from the fluid pressure control valve and instead, connect the wheel cylinder to a master cylinder. Inspection of the fail safe valve is carried out by disconnecting the wheel cylinder from the control valve when no brake is applied, feeding fluid pressure from the external source of fluid pressure to the wheel cylinder, and detecting a change in pressure within the wheel cylinder. An alert device is provided to give a warning in the event of a system failure.

11 Claims, 3 Drawing Sheets

BRAKE FLUID PRESSURE CONTROL SYSTEM AND METHOD OF CONTROLLING THE SAME

BACKGROUND OF THE INVENTION

The present invention relates to a brake fluid pressure control system designed to control the pressure of a brake fluid for use, particularly, in a motor vehicle.

Recently, a brake fluid pressure control system employs an external source of fluid pressure. In such a system, fluid pressure is developed in response to brake pedal displacement and applied from the external source to respective wheels. The brake pedal displacement is detected based, for example, on a change in pressure within a master cylinder.

Japanese laid-open patent publication No. 5-65060 discloses a similar brake fluid pressure control system wherein if a primary pressure fed from an external source of fluid pressure is accidentally decreased, an auxiliary pressure is fed from a master cylinder to a wheel cylinder for application of the necessary braking force. To this end, the prior art system includes a fail safe valve which is activated in accident condition to disconnect the wheel cylinder from the external source and in turn, connect the wheel cylinder directly to the master cylinder. In order to inspect the fail safe valve, it is necessary to place the motor vehicle in a maintenance area or a garage.

Accordingly, it is an object of the present invention to provide a brake fluid pressure control system which allows for ready inspection of a fail safe valve and thus, maintains reliability of the fail safe valve.

SUMMARY OF THE INVENTION

According to one aspect of the present invention, there is provided a brake fluid pressure control system for a motor vehicle, which comprises a wheel cylinder for producing a braking force, a master cylinder for developing a fluid pressure in response to brake pedal displacement and feeding the fluid pressure to the wheel cylinder, an external source of fluid pressure for supplying an external fluid pressure to the wheel cylinder, a fluid pressure control valve for supplying the external fluid pressure under control to the wheel cylinder, a fail safe valve for connecting the wheel cylinder selectively to the master cylinder and the fluid pressure control valve, and a controller for controlling the fluid pressure control valve in response to the brake pedal displacement. The controller is operable to control the fail safe valve so that normally, the external source of fluid pressure and the fluid pressure control valve are connected to the wheel cylinder, whereas the master cylinder is connected to the wheel cylinder in the event of a system failure. The controller is also operable to control the fail safe valve so as to disconnect the wheel cylinder from the fluid pressure control valve and detect a change in pressure within the wheel cylinder during inspection of the fail safe valve.

While the brake is in an inoperative state or the fluid pressure control valve and the wheel cylinder are maintained out of communication with one another under the influence of the fail safe valve, the fluid pressure control valve is activated to feed fluid pressure from the external source of fluid pressure. Inspection of the fail safe valve is carried out by detecting a change in pressure within the wheel cylinder. The driver is thus able to readily monitor the condition of the fail safe valve.

In a preferred mode, the fluid pressure control valve is so controlled as to gradually increase the external fluid pressure. The fail safe valve may be inspected when the vehicle is stopped, and the inspection may be carried out at given time intervals. Advantageously, means may be provided to provide a warning in the event that the fail safe valve malfunctions.

According to another aspect of the present invention, there is provided a method of controlling a brake fluid pressure control system comprising a wheel cylinder for producing a brake force, a master cylinder for developing a fluid pressure in response to brake pedal displacement and feeding the fluid pressure to the wheel cylinder, an external source of fluid pressure for supplying an external fluid pressure to the wheel cylinder, a fluid pressure control valve for supplying the external fluid pressure under control to the wheel cylinder, a fail safe valve for connecting the wheel cylinder selectively to the master cylinder and the fluid pressure control valve, and a controller for controlling the fluid pressure control valve in response to the brake pedal displacement, the controller being operable to control the fail safe valve so that normally, the external source of fluid pressure and the fluid pressure control valve are connected to the wheel cylinder, whereas the master cylinder is connected to the wheel cylinder in the event of a system failure, the method comprising the steps of determining whether it is necessary to inspect the fail safe valve, controlling the fail safe valve so as to disconnect the wheel cylinder from the fluid pressure control valve when it is determined to inspect the fail safe valve, and inspecting the fail safe valve by detecting a change in pressure within the wheel cylinder.

The method may further comprise the step of controlling the fluid pressure control valve so as to gradually increase the external fluid pressure when it is determined to inspect the fail safe valve, and providing a warning when a change in pressure within the wheel cylinder occurs.

According to yet another aspect of the present invention, there is provided a brake fluid pressure control system comprising a master cylinder for developing a fluid pressure in response to brake pedal displacement, an external source of fluid pressure for developing a fluid pressure greater than the fluid pressure of the master cylinder, a fluid pressure control valve disposed between the external source of fluid pressure and a wheel cylinder, a controller for determining a target fluid pressure in response to the brake pedal displacement, the controller being operable to control the fluid pressure control valve whereby a control fluid pressure is fed from the external source of fluid pressure to the wheel cylinder, a fail safe valve for disconnecting the wheel cylinder from the fluid pressure control valve and connecting the wheel cylinder to the master cylinder when the control fluid pressure decreases below the target fluid pressure, and means for inspecting the fail safe valve during no brake pedal displacement by detecting a change in pressure within the wheel cylinder when the fluid pressure control valve is driven to feed the fluid pressure from the external source of fluid pressure to the wheel cylinder while the wheel cylinder is disconnected from the fluid pressure control valve.

According to a further aspect of the present invention, there is provided a brake fluid pressure control system comprising brake force application means for applying a braking force to a wheel, primary fluid pressure supply means for supplying a primary fluid pressure to the brake force application means, auxiliary fluid pressure supply means for supplying an auxiliary fluid pressure to the brake force application means, selection means for connecting the brake force application means selectively to the primary fluid pressure supply means and the auxiliary fluid pressure supply means, and control means for controlling the selection means so as to normally connect the brake force application means to the primary fluid pressure supply means and connect the brake force application means to the auxiliary fluid pressure supply means in the event of a system failure. The control means is operable to control the selection means so as to disconnect the primary fluid pressure supply means from the brake force application means when no brake is applied, control the primary fluid pressure supply means so as to allow the primary fluid pressure supply means to supply the primary fluid pressure, and inspect the selection means by detecting a change in pressure within the brake force application means.

BRIEF DESCRIPTION OF THE DRAWINGS

The present invention will now be described by way of example with reference to the accompanying drawings, in which.

DESCRIPTION OF THE PREFERRED EMBODIMENTS

Figure 1:
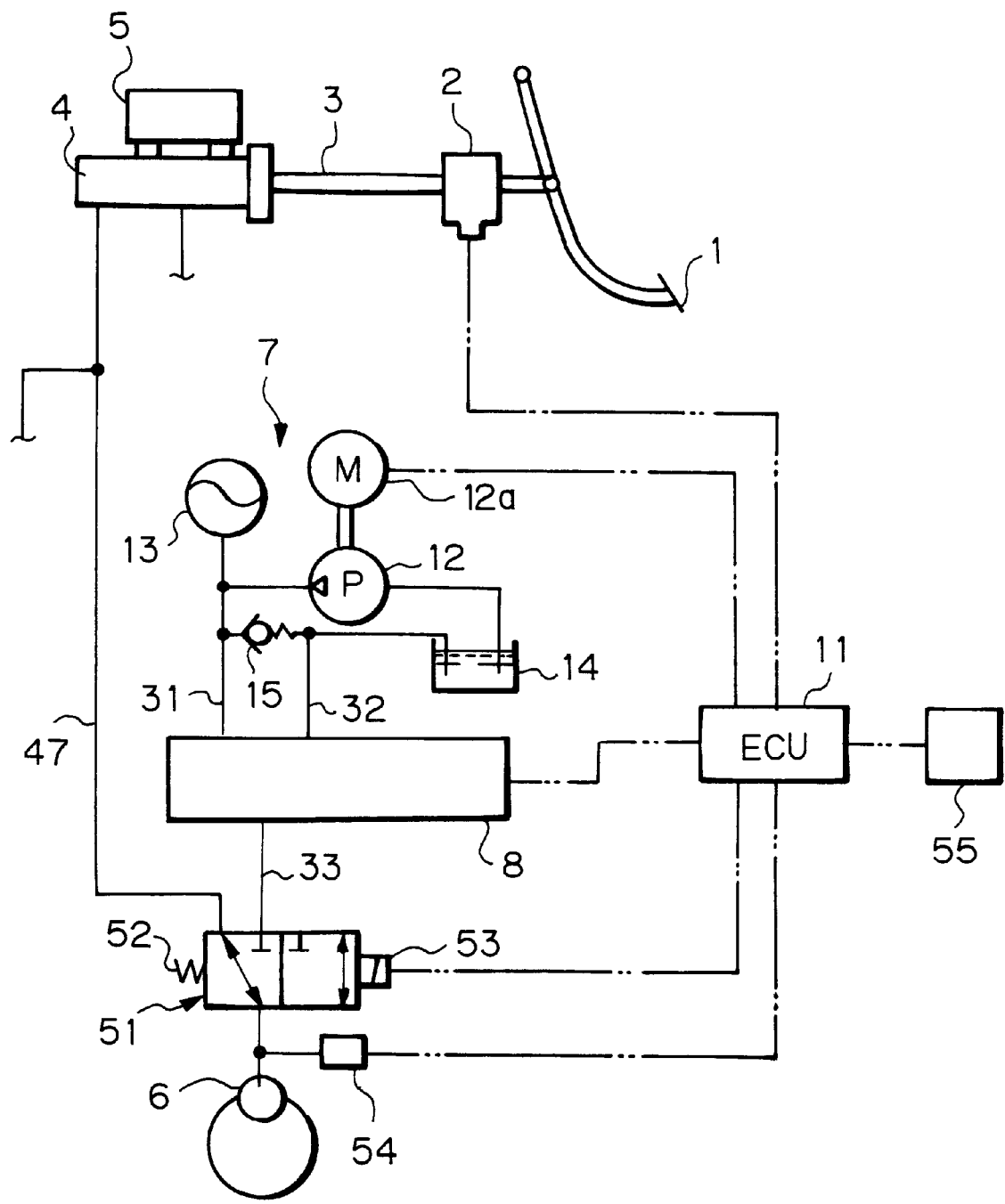
FIG. 1 is a diagrammatic representation of a brake fluid pressure control system according to one embodiment of the present invention.

Referring now to FIG. 1, there is illustrated a brake fluid pressure control system according to one embodiment of the present invention. A brake pedal 1 is connected through a rod 3 to a master cylinder 4 which is, in turn, provided with a reservoir 5. A displacement sensor 2 is mounted to the rod 3 so as to sense brake pedal displacement.

The reference numeral 6 designates a wheel cylinder for producing a braking force by the use of a fluid under pressure. 7 designates an external source of fluid pressure. 8 designates a fluid pressure control valve designed to receive a signal from the displacement sensor 2 and regulate the extent of a control fluid pressure which is fed from the external fluid pressure source 7 to the wheel cylinder 6. 11 designates an electronic control unit operable to activate the fluid pressure control valve 8 so as to control the fluid pressure.

The external fluid pressure source 7 includes a pump 12 driven by a motor 12a and adapted to develop fluid pressure. An accumulator 13 is connected to the output of the pump 12 and maintains a high level of fluid pressure.

The pump 12 is driven so as to pressurize a brake fluid drawn from a reservoir 14 and adapted to supply the brake fluid under pressure to the fluid pressure control valve 8 of each vehicle wheel. The reference numeral 15 designates a relief valve for releasing excess fluid pressure to the reservoir 14.

The fluid pressure control valve 8 serves to regulate a control fluid pressure to be applied from the external fluid pressure source 7 to the wheel cylinder 6. The control valve 8 is operated under the control of the electronic control unit 11.

Figure 2:
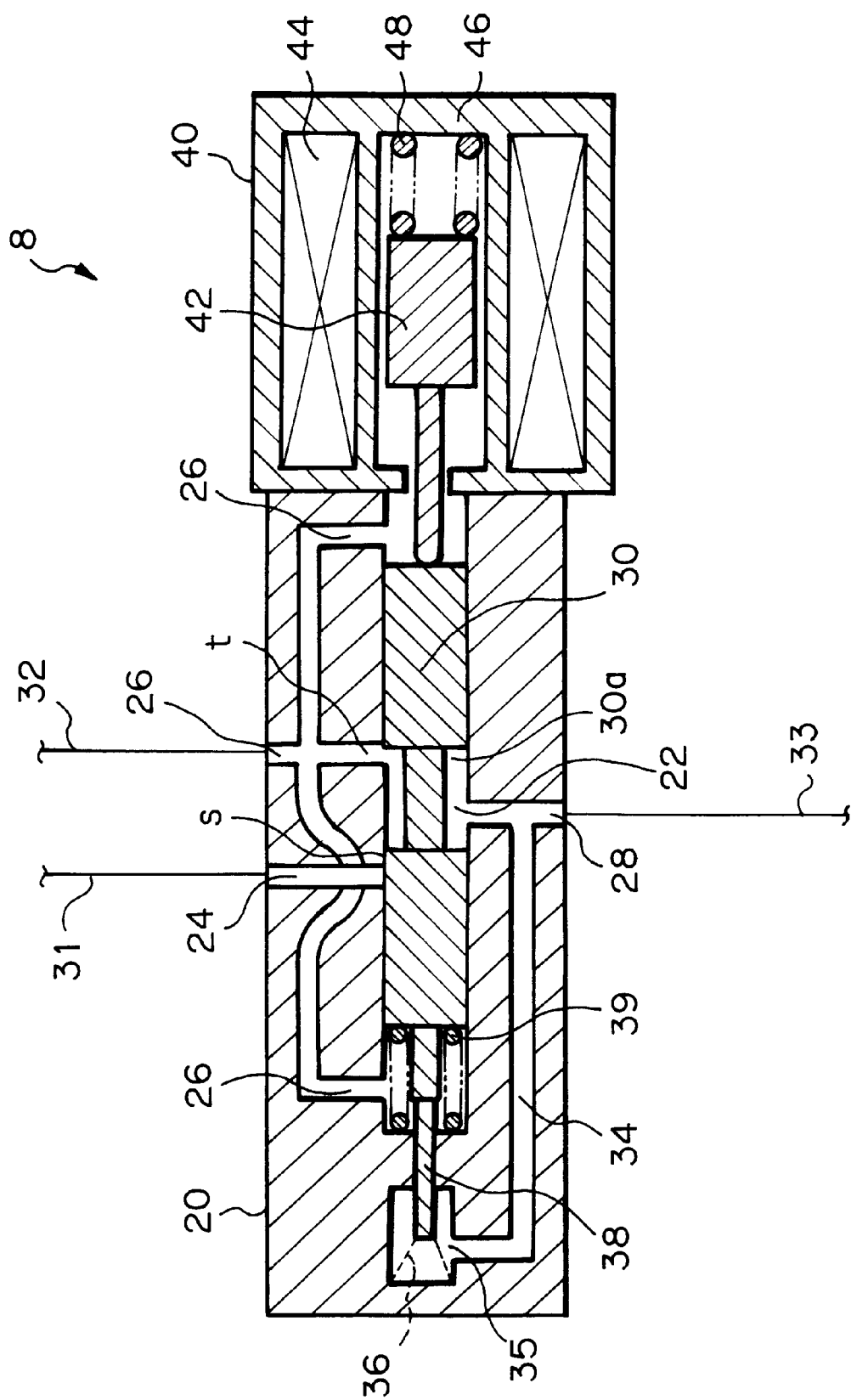
FIG. 2 is an enlarged sectional view of a fluid pressure control valve for use in the brake fluid pressure control system shown in FIG. 1.

Referring to FIG. 2, the control valve 8 includes a valve body 20 within which a valve bore 22 is defined. An inlet port 24, a drain port 26 and an outlet port 28 are also defined in the body 20 and communicated with the valve bore 22. The inlet port 24 is connected through a line 31 to the external fluid pressure source 7. The drain port 26 extends in such a manner as to provide communication between opposite ends of the valve bore 22. The drain port 26 is connected to a line 32 from the reservoir 14 and is open to ambient atmosphere. The outlet port 28 is connected through a line 33 to a fail safe valve 51 which will be described later.

A spool 30 is slidably received in the valve bore 22. The spool 30 has a reduced diameter at its center to form an annular groove 30a through which the inlet port 24 and the outlet port 28 are communicated with one another. The annular groove 30a enables two variable orifices s and t to be defined between the inlet port 24 and the spool 30 and between the drain port 26 and the spool 30, respectively. As the spool 30 is moved to the left in FIG. 2, the variable orifice s is opened whereas the variable orifice t is closed. This results in an increase in the pressure of a fluid through the outlet port 28. Conversely, the pressure of the fluid decreases when the spool 30 is moved to the right.

A line 34 extends from the outlet port 28 and is connected to a reaction chamber 35. The reaction chamber 35 is defined adjacent to one end of the valve body 20. Within the reaction chamber 35, reaction means 36 is provided to produce a reactive force. The reaction means 36 includes a spring or similar element. A pin 38 is connected to one end of the spool 30 and is slidably received within the reaction chamber 35. The pin 38 is forced toward the spool 30 by fluid pressure fed from the line 34 and a force developed by the reaction means 36. A compression spring 39 is disposed between one end of the valve bore 22 and the spool 30 and serves as a means for urging the spool to the right in FIG. 2.

A solenoid valve 40 is mounted to the other end of the valve body 20. The solenoid valve 40 comprises an armature 42 coaxial with the valve bore 22 and axially movable within the body of the solenoid valve 40, a coil 44 and a yoke 46 adapted to develop a force to axially move the armature 42, and a compression spring 48 disposed between the armature 42 and the yoke 46 and adapted to produce a leftward bias.

The coil 44 is designed to develop a force so as to axially move the armature 42 in response to the amount of a drive current I fed from the electronic control unit 11. The displacement of the armature 42 is proportional to the amount of the drive current I fed to the coil 44.

The line 33 has one end connected to the outlet port 28 of the control valve 8 and the other end connected to a fail safe valve 51. A line 47 has one end connected to the master cylinder 4 and the other end connected to the fail safe valve 51. The fail safe valve 51 includes a bias member 52 disposed to provide communication between the master cylinder 4 and the wheel cylinder 6, and a solenoid 53 adapted to receive a control current from the electronic control unit 11 and move a valve element against the bias of the bias member 52 so as to permit communication between the control valve 8 and the wheel cylinder 6. The fail safe valve 51 permits the wheel cylinder 6 to be communicated selectively with the control valve 8 and the master cylinder 4.

The wheel cylinder 6 is provided with a pressure sensor 54 for detecting pressure within the wheel cylinder 6 and sending a corresponding signal to the electronic control unit 11.

Additionally, alert means 55 is provided to provide a warning when the fail safe valve 51 malfunctions. The alert means 55 is in the form of a buzzer, a speaker, a lamp and other elements. If a warning signal is sent from the electronic control unit 11, the alert means 55 is rendered operative to produce a warning sound or light.

When the brake pedal 1 is depressed, the displacement sensor 2 is operable to detect brake pedal displacement and send a corresponding signal to the electronic control unit 11. The electronic control unit 11 is then operable to supply a control current to the solenoid 53 so as to move the valve element against the bias of the bias member 52. The wheel cylinder 6 is thereafter disconnected from the master cylinder 4 and in turn, connected to the control valve 8.

The electronic control unit 11 also serves to determine a target fluid pressure in response to brake pedal displacement as sensed by the displacement sensor 2 and supply a corresponding drive current I to the solenoid valve 40 of the control valve 8. With the drive current I, the spool 22 of the control valve 8 is moved to the left (or boost side) in FIG. 2. Fluid pressure is then fed from the external source 7 of fluid pressure through the control valve 8 and the fail safe valve 51 to the wheel cylinder 6 so as to apply a predetermined level of braking force to the respective wheel.

If, for some reason, the fluid pressure decreases below the target fluid pressure, a corresponding signal is sent from the pressure sensor 54 to the electronic control unit 11. The electronic control unit 11 is then operable to no longer supply a control current to the fail safe valve 51. As a result, the valve element of the fail safe valve 51 is moved under the action of the bias member 52. This movement causes the wheel cylinder 6 to be disconnected from the control valve 8 and instead, connected to the master cylinder 4. Pressure developed by the master cylinder as the brake pedal is depressed is directly supplied to the wheel cylinder 6.

The present invention provides a highly reliable brake fluid pressure control system in that if pressure from the external source 7 is undesirably decreased, the fail safe valve 51 is operable to directly feed pressure from the master cylinder to the wheel cylinder 6 so as to apply an appropriate level of braking force.

Figure 3:
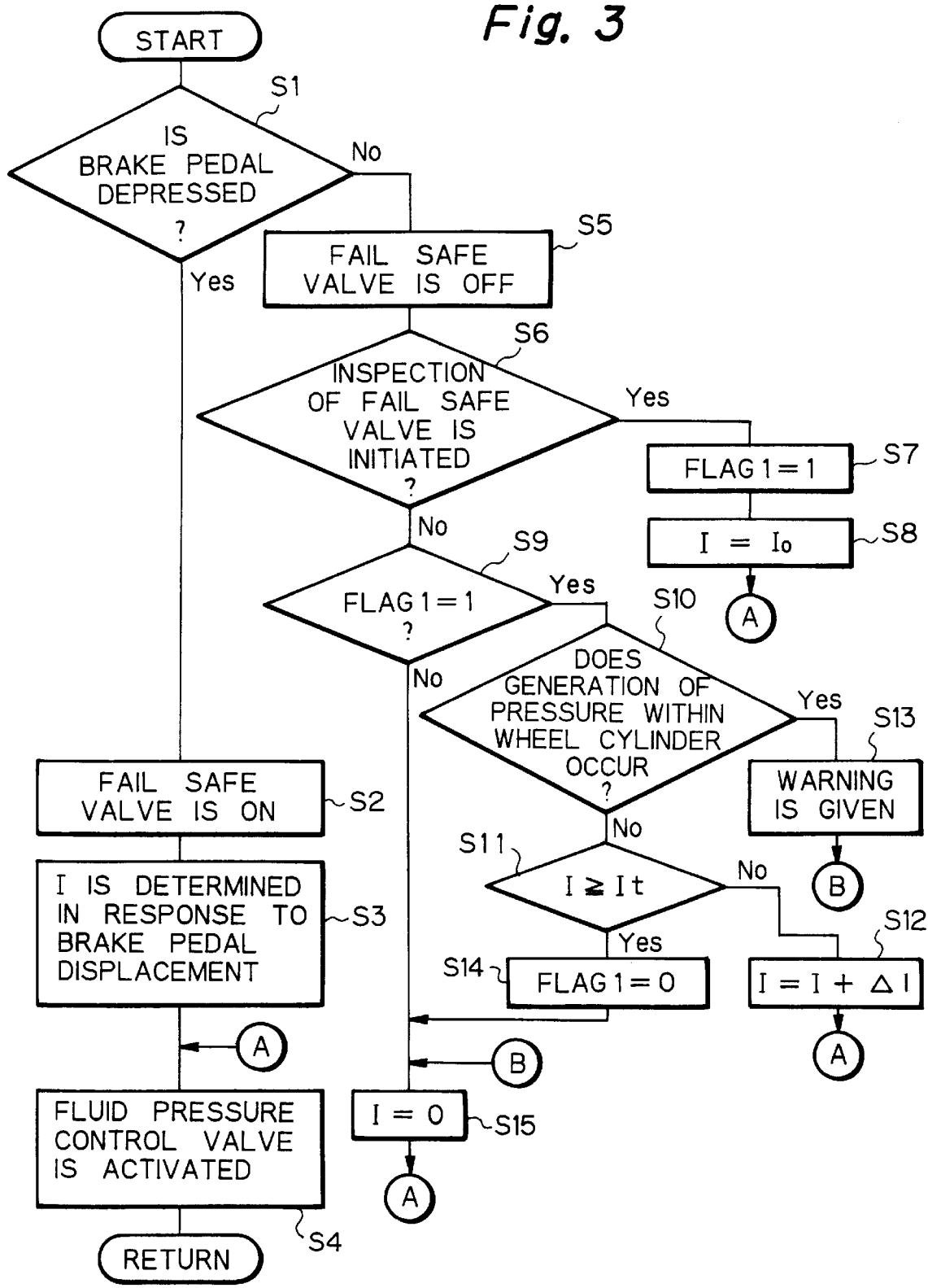
FIG. 3 is a flow chart showing the manner in which a fail safe valve is inspected.

FIG. 3 is a flow chart showing the manner in which the fail safe valve 51 is inspected.

When the brake pedal 1 is depressed, the solenoid 53 of the fail safe valve 51 becomes "on" whereby the fluid pressure control valve 8 and the wheel cylinder 6 are brought into communication with each other. At this time, a drive current I is generated in response to the brake pedal displacement and fed to the fluid pressure control valve 8. Fluid pressure under control is thereafter fed from the external source of fluid pressure 7 to the wheel cylinder 6 so as to apply a braking force to the wheel (see steps S1 to S4).

Inspection is initiated when the fail safe valve 51 is "off", that is, when the brake pedal is not in use. At this time, flag 1=1. The electronic control unit 11 is then operable to feed a drive current I0 to the fluid pressure control valve 8 so that the spool 30 is prepared to move (see steps S5 to S8). This drive current I0 is an initial current value which is not high enough to actually move the spool 30 of the fluid pressure control valve 8.

Thereafter, the drive current I is increased incrementally by ΔI, for example, 5 to 10 ms each (Flag 1=1). The drive current I is increased up to the value It which enables fluid pressure under control to be fed from the external source of fluid pressure 7 to the wheel cylinder 6 when the fail safe valve 51 is "on" (see steps S9 to S12). Preferably, the drive current I is incrementally increased so as to inhibit sudden operation of the wheel cylinder 6.

The drive current I0 is supplied to the fluid pressure control valve 8 when the inspection is initiated. The spool 30 can thus be moved immediately as an increase in the drive current I takes place. This arrangement enables all the inspection steps to be carried out within a short period of time.

While the drive current I is increased from the value I0 to the value It, the electronic control unit 11 is operable to detect generation of pressure within the wheel cylinder based on a signal from the pressure sensor 54. Such generation occurs in the event that the fail safe valve 51 malfunctions or the fluid pressure control valve 8 and the wheel cylinder 6 are not completely maintained out of communication with one another. As this occurs, a warning sound or light is fed from the alert means (for example, a buzzer, a speaker or a lamp) 55 so as to inform the driver of a system failure (see step 13). The alert means is reset when the ignition switch is "on".

If no change occurs while the drive current I is increased up to the value It, the electronic control unit 11 determines that the fail safe valve 51 is properly functioning. The value of Flag then becomes zero (Flag 1=0), and the drive current I also becomes zero. This completes the inspection steps (see steps S14 and S15).

As thus far described, the fail safe valve 51 is inspected while the brake is in an inoperative state. If the fail safe valve 51 malfunctions, a corresponding warning sound or light is given to the driver. In other words, the driver by himself is able to readily monitor the condition of the fail safe valve 51. The present invention is thus capable of providing a highly reliable brake control system.

It should be noted that the fail safe valve 51 can be inspected at given time intervals, or when the vehicle is stopped.

The present invention has been described with respect to its preferred embodiment. It is to be understood that various modifications and changes may be made without departing from the scope of the invention as defined by the appended claims.

What is claimed is:

1. A brake fluid pressure control system for a motor vehicle, comprising:

a wheel cylinder for producing a braking force;

a master cylinder for developing a fluid pressure in response to brake pedal displacement and feeding said fluid pressure to said wheel cylinder;

an external source of fluid pressure for supplying an external fluid pressure to said wheel cylinder;

a fluid pressure control valve for supplying said external fluid pressure under control to said wheel cylinder;

a fail safe valve for connecting said wheel cylinder selectively to said master cylinder and said fluid pressure control valve; and a controller for controlling said fluid pressure control valve in response to the brake pedal displacement, said controller being operable to control said fail safe valve so that said external source of fluid pressure and said fluid pressure control valve are connected to said wheel cylinder in response to the brake pedal displacement under a normal condition of the system, and that said master cylinder is connected to said wheel cylinder under a failed condition of the system, said controller being further operable to carry out an inspection of said fail safe valve, under a condition of no brake pedal displacement, by controlling said fail safe valve so as to disconnect said wheel cylinder from said fluid pressure control valve, controlling said fluid pressure control valve so that the external fluid pressure is supplied through said fluid pressure control valve toward said wheel cylinder, and detecting a generation of pressure within said wheel cylinder as an indication of failure of said fail safe valve.

2. The system of claim 1, wherein during said inspection of said fail safe valve, said controller is operable to control said fluid pressure control valve so as to gradually increase the external fluid pressure.

3. The system of claim 1, wherein said controller is operable to inspect said fail safe valve at given time intervals.

4. The system of claim 1, further comprising alert means for providing a warning during said inspection of said fail safe valve when said fail safe valve malfunctions.

5. A method of controlling a brake fluid pressure control system of a motor vehicle, said brake fluid pressure control system comprising a wheel cylinder for producing a brake force, a master cylinder for developing a fluid pressure in response to brake pedal displacement and feeding said fluid pressure to said wheel cylinder, an external source of fluid pressure for supplying an external fluid pressure to said wheel cylinder, a fluid pressure control valve for supplying said external fluid pressure under control to said wheel cylinder, a fail safe valve for connecting said wheel cylinder selectively to said master cylinder and said fluid pressure control valve, and a controller for controlling said fluid pressure control valve in response to the brake pedal displacement, said controller being operable to control said fail safe valve so that normally, said external source of fluid pressure and said fluid pressure control valve are connected to said wheel cylinder, whereas said master cylinder is connected to said wheel cylinder in the event of a system failure, said method comprising:

determining whether it is necessary to inspect said fail safe valve;

controlling said fail safe valve so as to disconnect said wheel cylinder from said fluid pressure control valve when it is determined to inspect said fail safe valve;

controlling said fluid pressure control valve so that the external fluid pressure is forcibly supplied through said fluid pressure control valve toward said wheel cylinder; and inspecting said fail safe valve by detecting a generation of pressure within said wheel cylinder as an indication of failure of said fail safe valve.

6. The method of claim 5, wherein in said determining step, said fail safe valve is inspected when no brake pedal displacement takes place.

7. The method of claim 6, further comprising the step of controlling said fluid pressure control valve so as to gradually increase said external fluid pressure when it is determined to inspect said fail safe valve.

8. The method of claim 6, wherein said fail safe valve is inspected at given time intervals.

9. The method of claim 5, further comprising providing a warning when the generation of pressure within said wheel cylinder occurs during inspection.

10. A brake fluid pressure control system comprising:

a master cylinder for developing a fluid pressure in response to brake pedal displacement;

an external source of fluid pressure for developing a fluid pressure greater than said fluid pressure of said master cylinder;

a fluid pressure control valve disposed between said external source of fluid pressure and a wheel cylinder;

a controller for determining a target fluid pressure in response to said brake pedal displacement, said controller being operable to control said fluid pressure control valve whereby a control fluid pressure is fed from said external source of fluid pressure to said wheel cylinder;

a fail safe valve for disconnecting said wheel cylinder from said fluid pressure control valve and connecting said wheel cylinder to said master cylinder when said control fluid pressure decreases below said target fluid pressure; and means for inspecting said fail safe valve for failure during no brake pedal displacement by detecting a generation of pressure within said wheel cylinder when said fluid pressure control valve is driven so that said fluid pressure of said external source is forcibly fed from said external source of fluid pressure through said fluid pressure control valve toward said wheel cylinder while said wheel cylinder is disconnected from said fluid pressure control valve.

11. A brake fluid pressure control system comprising:

brake force application means for applying a braking force to a wheel;

primary fluid pressure supply means for supplying a primary fluid pressure to said brake force application means;

auxiliary fluid pressure supply means for supplying an auxiliary fluid pressure to said brake force application means;

selection means for connecting said brake force application means selectively to said primary fluid pressure supply means and said auxiliary fluid pressure supply means; and control means for controlling said selection means so as to normally connect said brake force application means to said primary fluid pressure supply means and connect said brake force application means to said auxiliary fluid pressure supply means in the event of a system failure, said control means being operable to control said selection means so as to disconnect said primary fluid pressure supply means from said brake force application means when no brake is applied, control said primary fluid pressure supply means so as to allow said primary fluid pressure supply means to forcibly supply said primary fluid pressure, and inspect said selection means for failure by detecting a generation of pressure within said brake force application means while said selection means is controlled so as to disconnect said primary fluid pressure supply means from said brake force application means and while no brake is applied.

* * * * *